US009948984B2

(12) United States Patent
Trimper et al.

(10) Patent No.: US 9,948,984 B2
(45) Date of Patent: Apr. 17, 2018

(54) CONTENT PUBLISHING FOR PERSONALIZED CONTENT AGGREGATION PLATFORM

(71) Applicant: Verizon Patent and Licensing Inc., Arlington, VA (US)

(72) Inventors: John K. Trimper, Groton, MA (US); Michael P. Ruffini, Methuen, MA (US); Sankar Subramanian, Ossining, NY (US); Joseph G. Fragale, Ridgewood, NJ (US); Dwight W. Fronsdahl, Groton, MA (US); Paul D. Heitlinger, Short Hills, NJ (US); Rahul Kher, Lexington, MA (US); Eric N. Klings, Freehold, NJ (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 14/486,091

(22) Filed: Sep. 15, 2014

(65) Prior Publication Data

US 2016/0080807 A1    Mar. 17, 2016

(51) Int. Cl.
*H04N 21/458* (2011.01)
*H04N 21/2743* (2011.01)
(Continued)

(52) U.S. Cl.
CPC ......... *H04N 21/458* (2013.01); *H04N 5/4403* (2013.01); *H04N 21/25816* (2013.01);
(Continued)

(58) Field of Classification Search
CPC ........... H04N 7/17318; H04N 7/17336; H04N 21/47202; H04N 21/482; H04N 21/4622;
(Continued)

(56) References Cited

U.S. PATENT DOCUMENTS 8,224,931 B1 *   7/2012   Brandwine ......... H04L 41/5051
                                                      370/255
9,160,707 B2 *  10/2015   Ludwig ............... H04L 61/2575
(Continued)

FOREIGN PATENT DOCUMENTS

WO    WO 2014089447 A1 *   6/2014   ......... G06Q 30/0623

OTHER PUBLICATIONS

Bellata, Boris, "Flow-level QoS guarantees in IEEE 802.11e-EDCA based WLANs", (Dec. 2006) (available at http://citeseerx.ist.psu.edu/viewdoc/download?doi=10.1.1.104.4893&rep=rep1&type=pdf).*

(Continued)

*Primary Examiner* — Jonathan V Lewis
*Assistant Examiner* — Krista A Contino Saumby

(57) ABSTRACT

Network devices provide, to a content source device, an uplink user interface to describe and upload video content. The network devices receive, via the uplink user interface, descriptive information for the video content and generate, based on the descriptive information received via the uplink user interface, a unique content identifier for the video content. The network devices incorporate, based on the descriptive information, a listing of the video content into a catalog of content available to users of a content distribution network. The network devices receive, from the content source device, the video content and receive, from a user device, a request to view the video content that includes the unique content identifier. The network devices provide, to the user device, a link to enable the user device to access the video content via the content distribution network.

19 Claims, 10 Drawing Sheets

(51) Int. Cl.
*H04N 21/478* (2011.01)
*H04N 21/858* (2011.01)
*H04N 21/81* (2011.01)
*H04N 21/437* (2011.01)
*H04N 21/462* (2011.01)
*H04N 21/4627* (2011.01)
*H04N 21/482* (2011.01)
*H04N 21/472* (2011.01)
*H04N 21/475* (2011.01)
*H04N 21/854* (2011.01)
*H04N 21/258* (2011.01)
*H04N 21/40* (2011.01)
*H04N 21/61* (2011.01)
*H04N 5/44* (2011.01)

(52) U.S. Cl.
CPC ... *H04N 21/25875* (2013.01); *H04N 21/2743* (2013.01); *H04N 21/40* (2013.01); *H04N 21/437* (2013.01); *H04N 21/4622* (2013.01); *H04N 21/4627* (2013.01); *H04N 21/478* (2013.01); *H04N 21/4751* (2013.01); *H04N 21/4753* (2013.01); *H04N 21/47202* (2013.01); *H04N 21/482* (2013.01); *H04N 21/6125* (2013.01); *H04N 21/8173* (2013.01); *H04N 21/854* (2013.01); *H04N 21/8586* (2013.01)

(58) Field of Classification Search
CPC ............... H04N 7/173; H04N 21/6125; H04N 21/2385; H04N 21/40; H04N 21/4753; H04N 21/25875; H04N 21/25816; H04N 5/4403
See application file for complete search history.

(56) References Cited

U.S. PATENT DOCUMENTS

| | | | | |
|---|---|---|---|---|
| 2002/0194321 A1* | 12/2002 | Yaseen | ................ | H04L 12/5695 709/223 |
| 2004/0105415 A1* | 6/2004 | Fujiwara | ............... | H04W 24/00 370/338 |
| 2005/0201381 A1* | 9/2005 | Abbasi | ............. | H04L 29/06027 370/395.21 |
| 2005/0216940 A1* | 9/2005 | Black | .................... | H04N 7/163 725/87 |
| 2006/0068818 A1* | 3/2006 | Leitersdorf | ............ | H04H 20/18 455/466 |
| 2006/0242303 A1* | 10/2006 | Petrack | ............... | H04L 12/1822 709/227 |
| 2009/0313657 A1* | 12/2009 | Britt | ................... | H04N 7/17318 725/51 |
| 2010/0064324 A1* | 3/2010 | Jenkin | .................. | H04N 21/443 725/59 |
| 2010/0066808 A1* | 3/2010 | Tucker | ................ | H04L 12/1827 348/14.09 |
| 2012/0008786 A1* | 1/2012 | Cronk | .................. | H04L 63/102 380/282 |
| 2012/0131631 A1* | 5/2012 | Bhogal | .............. | H04N 21/4147 725/118 |
| 2013/0198274 A1* | 8/2013 | Papakipos | ............... | H04L 51/32 709/204 |
| 2013/0242064 A1* | 9/2013 | Herdy | .................. | H04N 5/4403 348/51 |
| 2013/0305274 A1* | 11/2013 | Gavita | ............... | H04L 41/5003 725/25 |
| 2014/0016569 A1* | 1/2014 | Chen | ..................... | H04W 48/16 370/329 |
| 2014/0096167 A1* | 4/2014 | Lang | .................. | H04N 21/4788 725/91 |
| 2014/0208374 A1* | 7/2014 | Delaunay | ............... | H04L 65/60 725/109 |

OTHER PUBLICATIONS

Noor, Rafidah, and Christopher Edwards, "User class mechanisms for quality of service in network mobility" Scientific Research and Essays vol. 5(24), pp. 3926-3931, Dec. 18, 2010 (available at http://www.academicjournals.org/article/article1380630474_Noor%20and%20Edwards.pdf).*

* cited by examiner

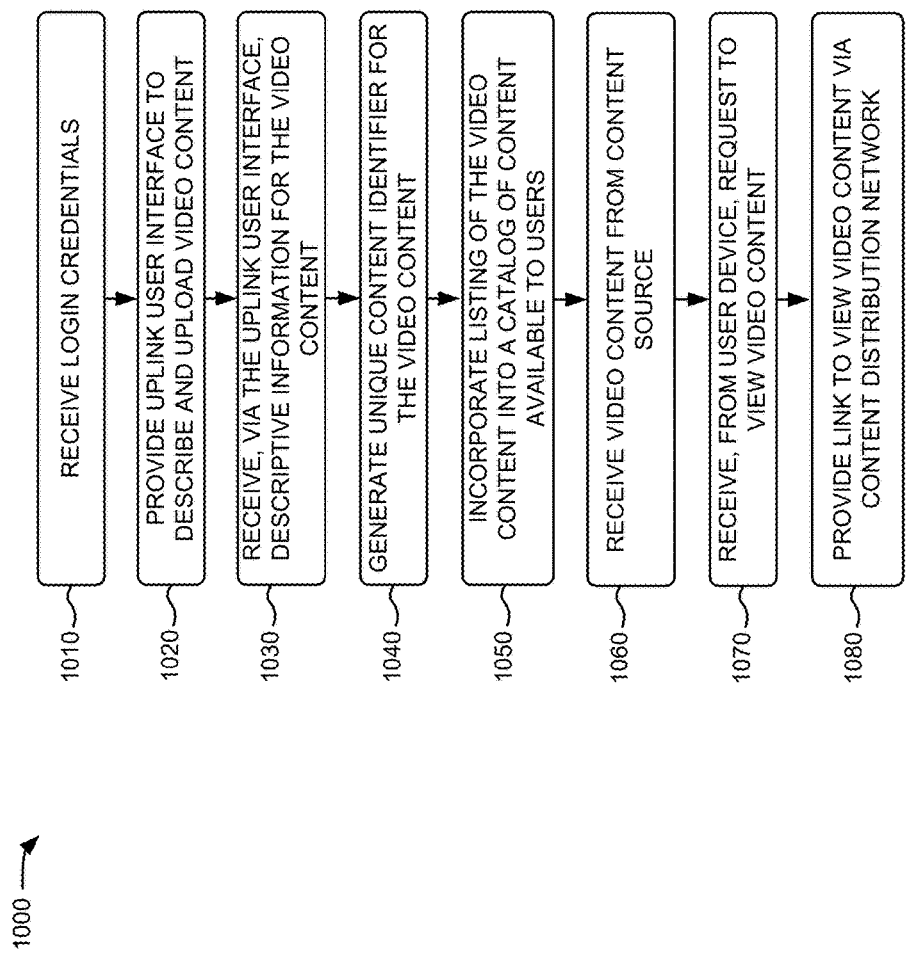

CONTENT PUBLISHING FOR PERSONALIZED CONTENT AGGREGATION PLATFORM

BACKGROUND

Along with live linear television content, service providers also offer products that allow customers to download video content (e.g., streaming video, video files, etc.) on demand over a distribution network. Broadcast content options may be presented to the customer via an electronic program guide. Access to on-demand video content is typically presented to the customer via a catalog of available items. Customers may supplement consumption of live linear television and/or on-demand content with content available through various Internet web sites.

BRIEF DESCRIPTION OF THE DRAWINGS

FIG. 10 is a flow diagram of an exemplary process for publishing content for access via a personalized channel according to an implementation described herein.

DETAILED DESCRIPTION OF PREFERRED EMBODIMENTS

The following detailed description refers to the accompanying drawings. The same reference numbers in different drawings may identify the same or similar elements.

Systems and methods described herein may enable users to publish video content for distribution over controlled networks. The published content may be distributed for direct viewing by subscribers or made available for use in a personalized content aggregation platform. The personalized content aggregation platform allows users to configure personalized content schedules (also referred to herein as "personalized channel plans") from multiple content sources and/or for multiple types of content. In one implementation, the personalized channel plan may be configured using a navigation device (e.g., a tablet computer or smart phone), which may instruct a display device (e.g., a set-top box or smart television) to present the content for the personalized channel plan according to the configured time and sequence. In another implementation, the personalized channel plan may be shared with other users (e.g., via social media, instant messages, etc.).

As described further herein, content available for inclusion in personalized channels may include (but is not limited to) traditional broadcast/cable television content, on-demand content, micro-published recorded video, and micro-published live content. Micro-published content (e.g., video files and/or live content that typically do not get viewed by a large number of viewers) has typically been restricted to distribution via video-sharing or streaming web sites over public access networks, such as the Internet. As such, providers of micro-published content (or self-published content) typically cannot guarantee the same quality of experience for their viewers as is typically provided with controlled-access networks, such as, for example, a cable television subscription service. Systems and method described herein provide tools to allow subscribers the similar access and delivery for micro-published content as is typically provided for traditional broadcast/cable content.

Figure 1:
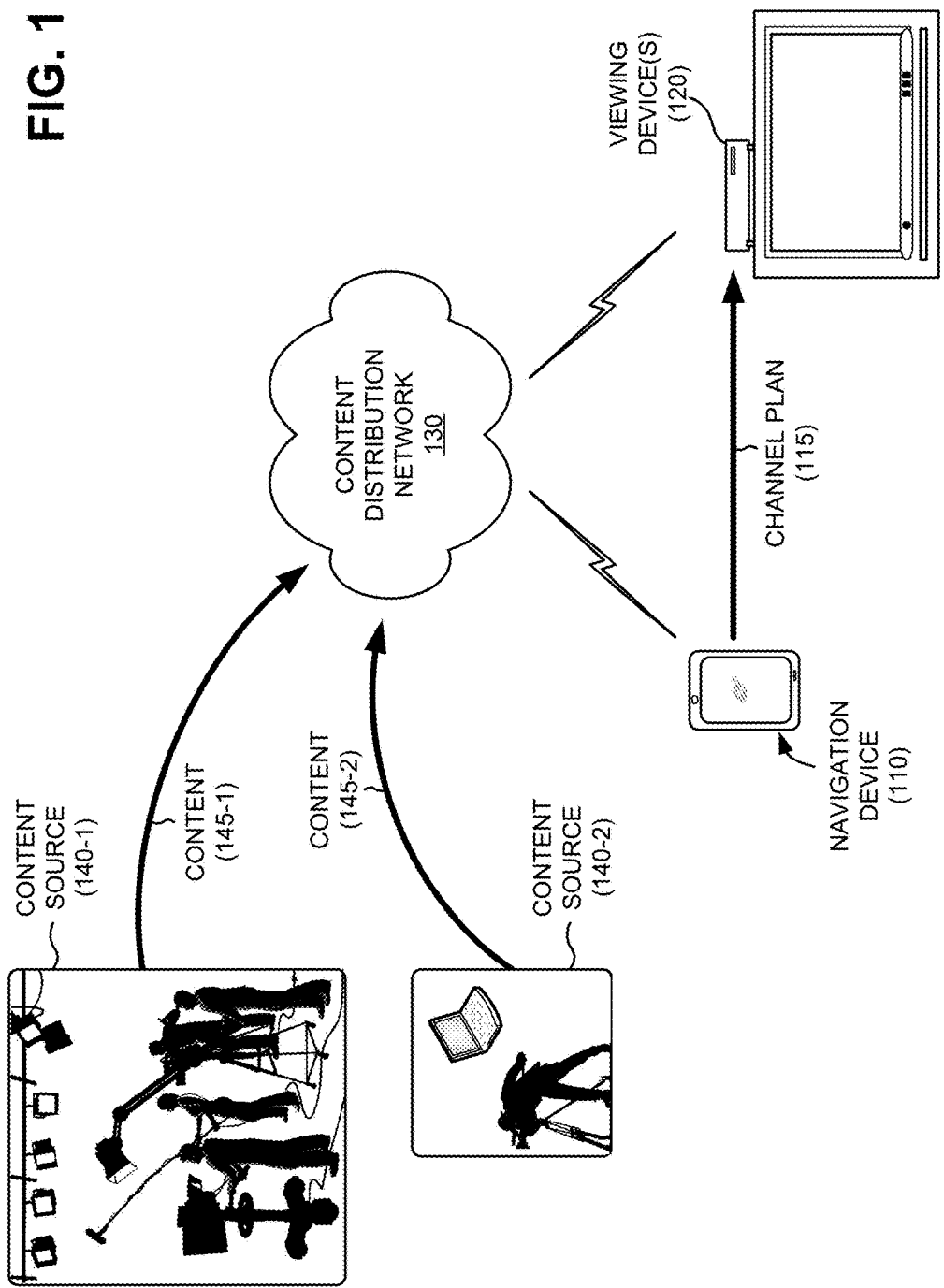
FIG. 1 is a diagram illustrating concepts described herein.

FIG. 1 is a diagram illustrating concepts described herein. A navigation device 110 (e.g., a tablet computer, smart phone, etc.) may be equipped with a personal channel manager application that enables a user to select a personalized channel plan 115 of linear and/or non-linear content that can be presented on a viewing device 120 (such as a set-top box (STB) and/or television). The personalized channel plan 115 may include content from, for example, multiple linear television channels (e.g., different physical or virtual television channels), video on demand (VOD) content, games, social media sites, video-sharing websites, etc. For example, navigation device 110 may obtain a catalog of available content from a content distribution network 130, which may be operated by a service provider that provides subscription-based services (e.g., television services, Internet access services, and/or other telecommunications services).

Content provided through content distribution network 130 may originate with content sources 140, such as content sources 140-1 and 140-2. Content source 140-1 represents a large-scale content provider, such as a commercial television network. Content source 140-2 represents a small-scale content provider, such as a micro-publisher. Content sources 140-1 and 140-2 may generate content 145-1 and 145-2, respectively, and may provide content 145-1 and 145-2 to content distribution network 130 for delivery to subscribers with access to content distribution network 130 (e.g., via navigation device 110 and/or viewing device 120). Content 145-1 and 145-2 may be provided to content distribution network 130 via different methods, such as a dedicated network connection, the Internet, or even physical delivery. Content distribution network 130 may process content received from content sources 140, catalog the content, and generate a dedicated channel/link that can be used to access the content with, for example, a guaranteed quality of service. While such content management has typically been available for large-scale content providers, these advantages have not generally been available to micro-publishers.

To configure a personalized channel, a user of navigation device 110 may select any available content (e.g., using an electronic catalog from content distribution network 130 or another program guide) and schedule available time slots. The schedule of programming may include live linear broadcast content that corresponds to a specific program time and/or recorded programs, which may be presented via the personalized channel on a delayed basis (e.g., at some scheduled time after the originally-broadcast program time). The schedule of programming may also include on-demand content (e.g., VOD content) or non-linear content, such as social media content or games.

Navigation device 110 may identify (or discover) available viewing devices 120 (such as a set-top box (STB)

and/or television) on which content from personalized channels can be presented. For example, navigation device 110 may identify viewing devices 120 via local wireless networks (e.g., WI-FI network, BLUETOOTH network, etc.). In one implementation, viewing devices 120 may be equipped with hardware and/or software to enable communication with navigation device 110. Using the personal channel manager application, a user may select a particular viewing device 120 on which to present content based on personalized channel plan 115.

According an implementation described herein, navigation device 110 may obtain, from content distribution network 130, links to content in personalized channel plan 115. For example, the personal channel manager application on navigation device 110 may obtain a separate link for each content item. Each separate link may be obtained either at the time of scheduling or at a point prior to the scheduled presentation time for the particular content. In one implementation, the link may provide a network location for content formatted particularly for a type of viewing device 120. As used herein, a "link" may generally refer to any pointer or instruction to identify a location, such as a uniform resource locator (URL), an Internet Protocol (IP) address, or channel indicator.

Navigation device 110 may provide links for content in the personal channels to viewing device 120 and control the presentation of content on viewing device 120. For example, navigation device 110 may cause viewing device 120 to access a particular link or "tune" to a particular broadcast channel at a particular time, according to the schedule of programming in the personalized channel. In one implementation, viewing device 120 may retrieve content via a controlled access network, such as a closed cable and/or fiber-optic distribution network, that can provide guaranteed quality of service (QoS) levels.

Thus, navigation device 110 may control viewing device 120 to present a personalized linear aggregation of programming (e.g., a personalized channel) that includes a variety of types of content from a variety of different sources, including different broadcast channels (e.g., representing different television networks), micro-published content, and/or different network locations.

Figure 2:
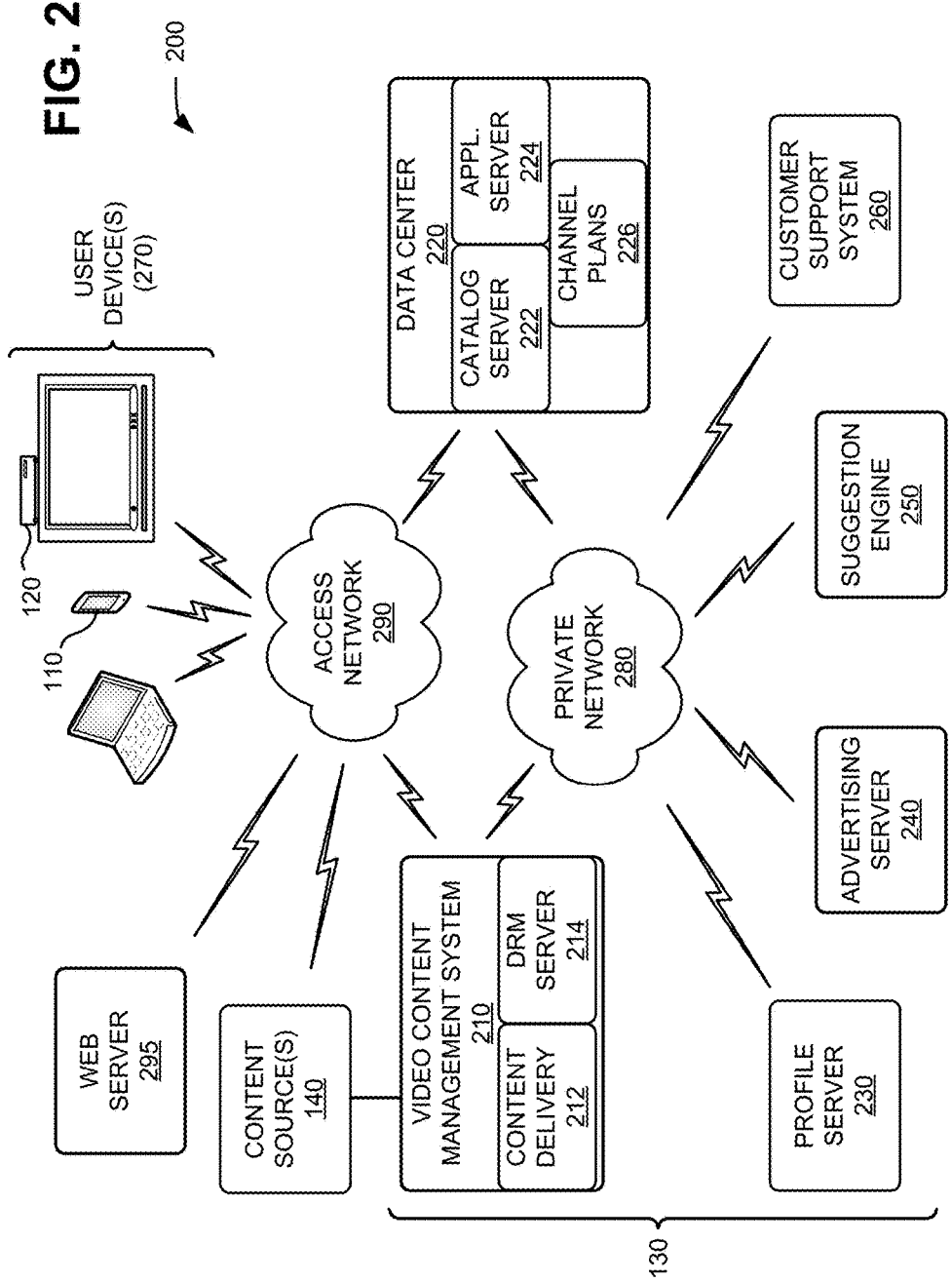
FIG. 2 is an exemplary network in which systems and/or methods described herein may be implemented.

FIG. 2 is an exemplary network 200 in which systems and/or methods described herein may be implemented. As illustrated, network 200 may include content sources 140, a video content management system (VCMS) 210, a data center 220, a profile server 230, an advertising server 240, a suggestion engine 250, a customer support system 260, user devices 270, a private network 280, an access network 290, and a web server 295. VCMS 210, data center 220, profile server 230, advertising server 240, suggestion engine 250, customer support system 260, and private network 280 may be part of content distribution network 130. The particular arrangement and number of components of network 200 shown in FIG. 2 are illustrated for simplicity. In practice there may be more content sources 140, VCMSs 210, data centers 220, profile servers 230, advertising servers 240, suggestion engines 250, customer support systems 260, user devices 270, networks 280/290, and/or web servers 295. Components of network 200 may be connected via wired and/or wireless links.

Content sources 140 may include one or more content source devices to provide any type or form of content to VCMS 210 for distribution. For example, content source 140 may include free television broadcast providers (e.g., broadcast providers, such as NBC, CBS, ABC, and/or FOX) and for-pay television broadcast providers (e.g., TNT, ESPN, HBO, CINEMAX, CNN, etc.) that permit content to be streamed and/or downloaded. Content sources 140 may also include on-demand content providers (e.g., video on demand (VOD) providers, pay per view (PPV) providers, etc.), online content providers (e.g., webcasts, podcasts, etc.), etc. According to implementations described herein, content sources 140 may also include micro-published content providers, such as video content generated from mobile devices, video cameras, and other consumer electronics equipment, and that is not typically viewed by a large number of viewers.

VCMS 210 may include one or more network devices, or other types of computation or communication devices, to aggregate content and content metadata, process content, and distribute content. In one implementation, VCMS 210 may include a content delivery system 212 and a digital rights management (DRM) server 214. VCMS 210 may aggregate content and transcode content into a digital format suitable for consumption on particular user devices 270. For example, VCMS 210 may include a transcoding device to convert a video file from one format to another (e.g., from one bit rate to another bit rate, from one resolution to another, from one standard to another, from one file size to another, etc.). VCMS 210 may also encrypt data and communicate with DRM server 214 to enforce digital rights. In some cases, VCMS 210 may also supply content with particular regional (e.g., location-based) variations.

According to implementations described herein, VCMS 210 may solicit and process content uploaded from content sources 140. For example, VCMS 210 may receive credentials to authorize users and provide a user interface (e.g., a web-based interface) to allow users to register, categorize, and upload content. VCMS 210 may also interface with catalog server 222 to provide private or public catalog entries for registered content and may generate links (e.g., URLs, etc.) to enable viewing devices 120 to access registered content.

Content delivery system 212 may include one or more network devices, or other types of computation or communication devices, to deliver multimedia content from a backend server to user devices 270. In one implementation, content delivery system 212 may include a streaming server that provides streaming data packets (e.g., via a streaming URL) to user devices 270 (e.g., via network 280). Content delivery system 212 may provide content via different delivery mechanisms, such as a broadcast stream, a multicast stream, or a unicast stream, as determined (at least in part) by the type of content and the projected viewing audience size. In one implementation, a streaming URL may be session-based, such that each URL can be used only once for one user device 270 for security purposes. In another implementation, content delivery system 212 may provide interactive content, such as games, etc.

DRM server 214 may include one or more network devices, or other types of computation or communication devices, to issue, validate, and/or enforce DRM licenses to a client, such as an application running on one of user devices 270. In implementations herein, DRM server 214 may communicate with user device 270 to authenticate a user of user device 270, the particular user device 270, and/or an application residing on user device 270. For example, DRM server 214 may request/receive login information associated with the user, and compare the login information with stored information to authenticate the user. Additionally, or alternatively, DRM server 214 may request/ receive device information (e.g., a unique device identifier)

associated with user device 270 and may compare the device information with stored information to authenticate user device 270.

Data center 220 may include one or more network devices, or other types of computation or communication devices, to manage the authorization, selection, scheduling, and/or purchase of multimedia content by a user of user devices 270. As shown in FIG. 2, data center 220 may include a catalog server 222, an application server 224, and channel plans 226. In one implementation, data center 220 may be accessed by user devices 270 via access network 290.

Catalog server 222 may include one or more network devices, or other types of computation or communication devices, to provide a unified catalog of multimedia content for users (e.g., of user devices 270) to consume (e.g., view, buy, or rent). Catalog server 222 may include, for example, program guide data for television content, on-demand content data, games, etc. In one implementation, catalog server 222 may collect and/or present listings of content available to user devices 270. For example, catalog server 222 may receive content metadata, such as lists or categories of content, from VCMS 210. Catalog server 222 may use the content metadata to provide currently-available content options to user devices 270. In one implementation, private content (e.g., content available to accounts/users identified by a content source) may be included in catalog listings provided to applicable users of navigations devices 110. Catalog server 222 may provide the content metadata to user devices 270 directly or may communicate with user devices 270 via application server 224.

Application server 224 may include one or more network devices, or other types of computation or communication devices (e.g., a server device, an application server device, a Web server device, a database server device, a computer, etc.), to provide a backend support system for mobile applications residing on user devices 270. For example, application server 224 may permit user devices 270 to download a personal channel manager application that may permit a user to find content of interest, schedule content presentation, and/or play downloaded or streaming content. The personal channel manager application may enable user devices 270 to present, to a user of user device 270, information received from data center 220 in an interactive format to allow selection of particular multimedia content. Additionally, or alternatively, application server 224 may provide content metadata, such as lists or categories of content. Also, application server 224 may authenticate a user who desires to view, purchase, or rent multimedia content. In one implementation, the interactions between application server 224 and user device 270 may be performed using hypertext transfer protocol (HTTP) or secure HTTP (HTTPS) via access network 290.

Channel plans 226 may include a stored schedule of selected content items (e.g., selected by a user from catalog server 222) for presentation. In one implementation, channel plans 226 may be associated with a single user (e.g., a personalized channel owner). In another implementation, channel plans 226 may be associated with multiple users (e.g., a personalized channel owner and one or more followers) and multiple user devices 270. In one aspect, data center 220 may monitor the number of "followers" associated with a particular channel plan to identify if multicast delivery methods (e.g., using mobile broadcasting multimedia service (MBMS)) may be useful for content delivery of non-broadcast content. In another aspect, data center 220 may compare multiple different channel plans to identify instances where the same unicast content is scheduled for simultaneous distribution on different personalized channels. If instances of simultaneous unicast distribution are identified, data center 220 may elect to apply multicast content delivery methods.

Profile server 230 may include one or more network devices, or other types of computation or communication devices, to store user profile information for users (e.g., users of user devices 270). Profile server 230 may store per-user and/or per-device preferences. The user profile information may include various information regarding a user, such as login information (e.g., a user identifier and a password), billing information, address information, types of services to which the user has subscribed, parental control settings, preferred display format, subtitle defaults, relevant advertising settings, most-watched media, a list of multimedia content purchased by the user, user device identifiers (e.g., a media player identifier, a mobile device identifier, a set top box identifier, a personal computer identifier, etc.) for user devices 270 associated with a user, user content preferences, user tendencies, or the like. In one implementation, profile server 230 may include and/or access a database that includes user/device information from other systems, such as a wireless data service plan, a television subscription plan, or an Internet service plan. Thus, metadata from a single user on multiple devices (e.g., mobile devices, television-based devices, computing devices, etc.) may contribute to user profiles maintained by profile server 230. Application server 224 may use the user profile information from profile server 230 to authenticate a user and may update the user profile information based on the user's activity (e.g., with a user's express permission).

Advertising server 240 may include one or more network devices, or other types of computation or communication devices, that store advertising content that may be delivered to user devices 270. The advertising content may include, for example, metadata that allows the advertising content to be associated with particular groups, categories, and/or profiles. The advertising content may include, for example, a unique identifier for each particular advertisement. In one implementation, advertising server 240 may provide advertising content for insertion into a content stream from VCMS 210.

Suggestion engine 250 may include one or more network devices, or other types of computation or communication devices, that provide suggestions and/or recommendations of specific content (e.g., TV programming, VOD titles, video games, etc.) based on user profiles (from profile server 230), user preferences (e.g., as indicated in a personal channel manager application), or other factors, such as popularity ratings for a show. In one implementation, suggestion engine 250 may provide a suggestion for a scheduled time slot in a personal channel. Suggestion engine 250 may also take into account subscription restrictions, pre-defined parameters set by parents, time-slot length, etc. In some implementations, suggestion engine 250 may track user activity from a television subscription plan, a wireless data plan, and/or an Internet service plan to learn user viewing habits and provide content recommendations.

Customer support system 260 may include one or more network devices, or other types of computation or communication devices, to solicit and/or receive user feedback, questions, or credit-related requests. In one implementation customer support system 260 may include interfaces with data center 220 and/or a billing system (not shown), for example, to receive problem reports and to resolve customer billing disputes.

User devices 270 may generally include navigation devices 110, viewing devices 120, and other computing devices. Navigation device 110 may include a computation or communication device to enable a user to schedule presentation of content and/or interact with viewing device 120 to cause presentation of content. Navigation device 110 may include, for example, a personal communications system (PCS) terminal, a tablet computer, a smartphone, a personal computer, a laptop computer, a wearable computer, or other types of computation or communication devices. In one implementation, navigation device 110 may include a personal channel manager application that enables navigation device 110 to communicate with, for example, data center 220 and/or present information received from data center 220 to a user. The personal channel manager application may permit a user of navigation device 110 to log into an account (e.g., via application server 224), access catalog information (e.g., from catalog server 222), obtain content links to scheduled content, and/or provide presentation instructions to viewing device 120.

Viewing device 120 may include a device that can present content identified by navigation device 110. Viewing device 120 may include, for example, an STB (e.g., connected to a television), a gaming console, an Internet television, a smart television (e.g., a network-connected television), a computing device with a cable card, etc. Viewing device 120 may execute a host application to communicate via a local wired or wireless connection with navigation device 110. In one implementation, viewing device 120 may execute an application to communicate via access network 290 with, for example, VCMS 210 or web server 295 to present content based on instructions from navigation device 110. In another implementation, viewing device 120 may be equipped with a dongle to permit secure communications with a personal channel manager application on navigation device 110. In some instances, navigation device 110 and viewing device 120 may be combined in a single device. In one implementation, viewing device 120 may be a closed device (e.g., including a hardware/software configuration that is not accessible to the general public), such as an STB with a unique identifier (e.g., a serial number) that can be used to associate a particular STB with a particular customer/location.

Private network 280 may include, for example, one or more private IP networks that use a private IP address space. Private network 280 may include a local area network (LAN), an intranet, a private wide area network (WAN), etc. In one implementation, private network 280 may implement one or more Virtual Private Networks (VPNs) for providing communication between, for example, any of VCMS 210, data center 220, profile server 230, advertising server 240, suggestion engine 250, and/or customer support system 260. In one implementation, private network 280 may be protected/separated from other networks, such as access network 290, by a firewall. Although shown as a single element in FIG. 2, private network 280 may include a number of separate networks.

Access network 290 may include a local area network (LAN), a wide area network (WAN), such as a cellular network, a satellite network, a fiber optic network, a private WAN, or a combination of the Internet and a private WAN, etc., that is used to transport data. In one implementation, access network 290 may include a managed network that can be used to provide guaranteed service rates and QoS to user devices 270. Although shown as a single element in FIG. 2, access network 290 may include a number of separate networks that provide services to user devices 270.

Web server 295 may include one or more network devices, or other types of computation or communication devices, to receive provide information to user devices 270 and/or to receive information from user devices 270. In one implementation, web server 295 may be part of a social media platform to received and distribute files, such as a personalized channel plan, uploaded by a user of user device 270. In another implementation, web server 295 may include an Internet content source, a search engine, etc.

Figure 3:
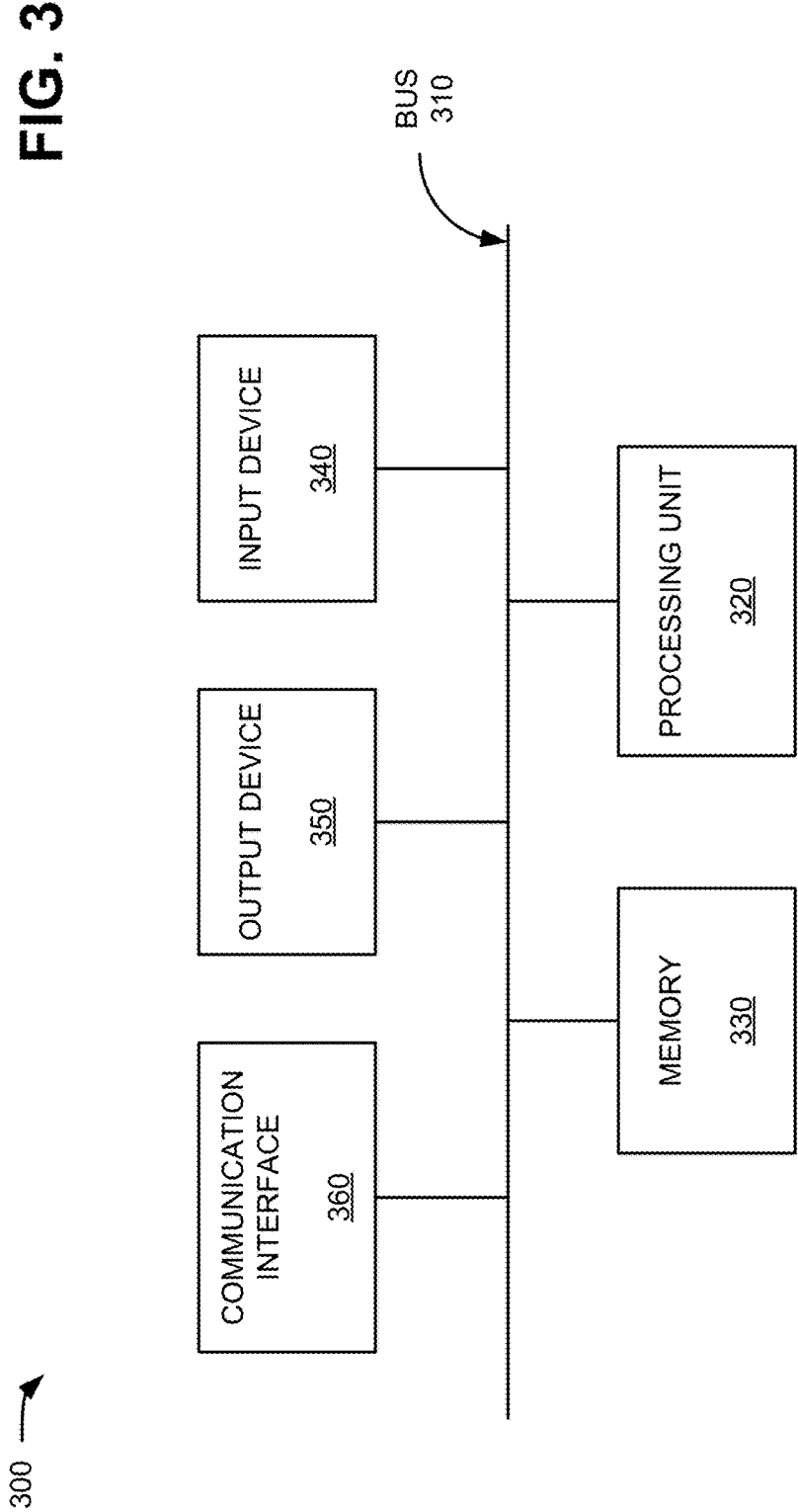
FIG. 3 is a block diagram of exemplary components of a device that may correspond to one of the devices of FIG. 2.

FIG. 3 is a diagram of exemplary components of a device 300. Each of VCMS 210, content delivery system 212, DRM server 214, data center 220, catalog server 222, application server 224, profile server 230, advertising server 240, suggestion engine 250, customer support system 260, user device 270, and web server 295 may be implemented/installed as software, hardware, or a combination of hardware and software, on one or more of device 300. In one implementation, device 300 may be configured as a network device. In another implementation, device 300 may be configured as a computing device. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a touch screen, a keypad, a mouse, a pen, a microphone, one or more biometric mechanisms, a voice or speech recognition system, and the like. Output device 350 may include a device that outputs information to the operator, such as a display, a speaker, etc.

Communication interface 360 may include a transceiver that enables device 300 to communicate with other devices and/or systems. For example, communication interface 360 may include wired or wireless (e.g., radio frequency) mechanisms for communicating with other devices, such as other devices of network 200.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, a display may not be included in device 300. In these situations, device 300 may be a "headless" device that does not include an input device. Alternatively, or additionally, one or more components of device 300 may perform one or more other tasks described as being performed by one or more other components of device 300.

Figure 4:
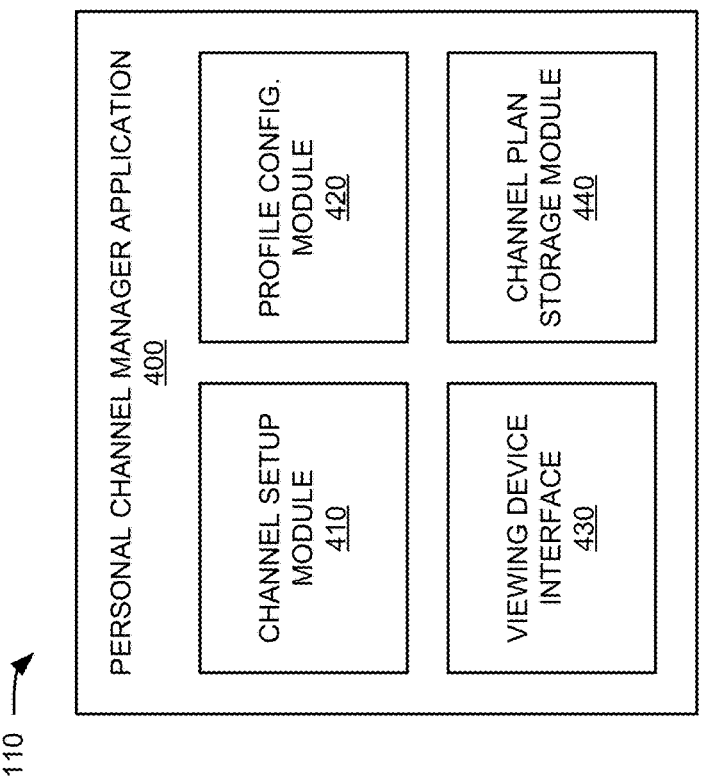
FIG. 4 is a block diagram of exemplary functional components of the navigation device of FIG. 1.

FIG. 4 is a block diagram of exemplary functional components of navigation device 110. The functions described in connections with FIG. 4 may be performed by one or more components of device 300 (FIG. 3), such as processing unit 320 executing instructions stored in memory 330. As shown in FIG. 4, navigation device 110 may include a personal channel manager application 400 that includes a channel setup module 410, a profile configuration module 420, a viewing device interface 430, and a channel plan storage module 440. Generally, personal channel manager application 400 may allow a navigation device 110 solicit a personalized content schedule from a user and to direct presentation of the personalized content schedule on viewing device 120.

Channel setup module 410 may provide a user interface to present content options and configure a personalized content schedule (or channel plan). Content options may include, for example, items from catalog server 222, items from web server 295, and/or other multimedia content accessible via access network 290. In one implementation, channel setup module 410 may provide a grid of time slots that can be selectively filled in with content items from a catalog listing. For example, channel setup module 410 may include a drag-and-drop interface to insert content selections into a particular time slot in the grid. In one implementation, selected linear content (e.g., television content, VOD content, downloads, streaming media, etc.) may automatically fill an amount of time in the grid that corresponds to a selected program. In another implementation, selected non-linear content (e.g., games, music, social media, etc.) may be assigned a duration by the user. In still another implementation, a user may assign a default channel or content source for any time period not otherwise scheduled in the personalized content schedule. Channel setup module 410 may also be used to modify existing channel plans. Channel setup module 410 may communicate with content distribution network 130 to obtain particular links (e.g., URLs) for content items in the personalized content schedule. In some implementations, channel setup module 410 may also provide new/updated channel plans to content distribution network.

Profile configuration module 420 may provide a user interface to solicit user preferences. For example, profile configuration module 420 may allow a user to provide definitive settings to guide/limit suggested content. Settings provided by a user may include, for example, user data (e.g., age, gender, etc.) and/or content preferences, such as content ratings (MOTION PICTURE ASSOCIATION OF AMERICA (MPAA) ratings, etc.), content age, favorite actors, preferred genres, minimum critic/viewer ratings, etc. In one implementation, profile configuration module 420 may communicate with profile server 230, advertising server 240, and/or suggestion engine 250 to allow content distribution network 130 to identify suggested content and/or advertising for a user's personalized channel.

Viewing device interface 430 may communicate with viewing device 120 to present a personalized content schedule from channel setup module 410. In one implementation, viewing device interface 430 may communicate with a host application executed on viewing device 120 to instruct viewing device 120 when and what channel/content to display. For example, viewing device interface 430 may monitor the personalized content schedule and, depending on the type of content included in the current time slot of a personalized content schedule (e.g., channel plan 115), viewing device interface 430 may instruct viewing device 120 to tune to a particular broadcast channel, load VOD content, or access a URL for web-based content.

Viewing device interface 430 may monitor a personalized content schedule, retrieve one or more links to upcoming content, and provide the links to viewing device 120 for presentation according to the personalized content schedule. Viewing device interface 430 may identify viewing devices 120 that are available to present a personalized content schedule based on instructions from navigation device 110. In one implementation, viewing device interface 430 may identify viewing device 120 via wireless network discovery protocols, such as WI-FI protocols, BLUETOOTH protocols, or other wireless protocols. In another implementation, viewing device interface 430 may apply additional application programming interfaces (APIs), protocols, and/or procedures to identify a type of viewing device 120.

Channel plan storage module 440 may retrieve and/or store personalized channel plans. For example, channel plan storage 440 may store multiple personalized channel plans for a single user or for different users of navigation device 110. In one implementation, channel plan storage module 440 may also upload a personalized channel plan to content distribution network 130.

Although FIG. 4 shows exemplary functional components of navigation device 110, in other implementations, navigation device 110 may include fewer components, different components, or additional components than depicted in FIG. 4. Alternatively, or additionally, one or more functional components of navigation device 110 may perform one or more other tasks described as being performed by one or more other functional components of navigation device 110. Furthermore, one or more functional components of FIG. 4 may be performed on a different user device 270. For example, in some implementations, channel setup module 410 may be accessed with user device 270 via a website account and the resulting personalized channel plan later retrieved/stored on navigation device 110.

Figure 5:
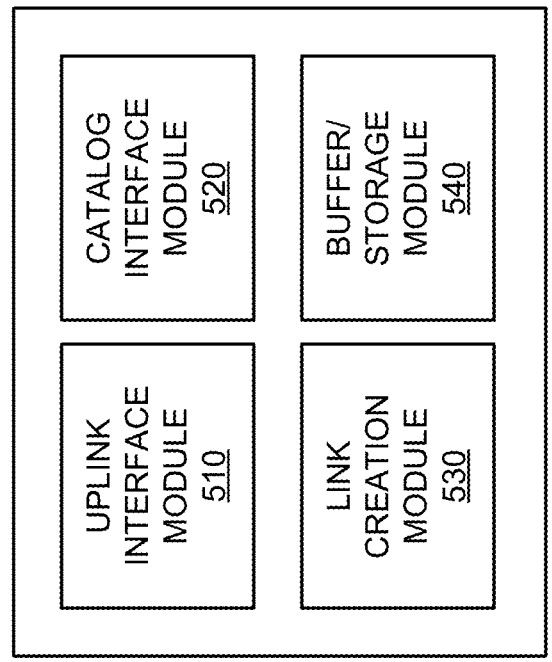
FIG. 5 is a block diagram of exemplary functional components of the video content management system (VCMS) of FIG. 2.

FIG. 5 is a diagram of exemplary functional components of VCMS 210. In one implementation, the functions described in connection with FIG. 5 may be performed by one or more components of device 300 (FIG. 3), such as processing unit 320 executing instructions store in memory 330. As shown in FIG. 5, VCMS 210 may include an uplink interface module 510, a catalog interface module 520, link creation module 530, and buffer/storage module 540.

Uplink interface module 510 may provide an interface to enable users of content source 140 to upload and register content for distribution through content distribution network 130. In one implementation, uplink interface module 510 may include a web server to provide a web page to allow a user to navigate through a content uploading process. In another implementation, uplink interface module 510 may interact with a client application at content source 140. Uplink interface module 510 may allow a user to designate content for publication as live (e.g., real-time) or stored (e.g., on-demand). Uplink interface module 510 may also allow content to be designated as public (e.g., generally accessible/searchable to those with access to content distribution network 130) or private (e.g., restricting access to designated users/accounts). Other content settings configurable through uplink interface module 510 are described further in connection with the exemplary user interface of FIG. 9 below.

Catalog interface module 520 may obtain content descriptors and/or metadata for uploaded content and provide the relevant content descriptors and/or metadata to catalog server 222. For example, catalog interface module 520 may collect and store data received via uplink interface module 510 and generate a catalog entry with information such as a title, source, and searchable keywords to be made available to users of navigation devices 110.

Link creation module 530 may generate one or more unique links for content uploaded via uplink interface module 510. For example, link creation module 530 may generate a unique URL for uploaded content based on a title, source, date, etc. In one implementation, link creation module 530 may apply a hash algorithm to generate the URL from designated content metadata fields.

Buffer/storage module 540 may manage receipt and storage of uploaded content 540. In one implementation, buffer/storage module 540 may perform a checksum or signature verification. Additionally, or alternatively, buffer/storage module 540 may use metadata from a particular upload request via uplink interface module 510 to confirm all segments for a particular content upload are received. Buffer/storage module 540 may also designate and track storage of uploaded content in one or more memory locations of content distribution network 130.

Although FIG. 5 shows exemplary functional components of VCMS 210, in other implementations, VCMS 210 may include fewer components, different components, or additional components than depicted in FIG. 5. Alternatively, or additionally, one or more functional components of VCMS 210 may be performed by one or more other devices in content distribution network 130.

Figure 6:
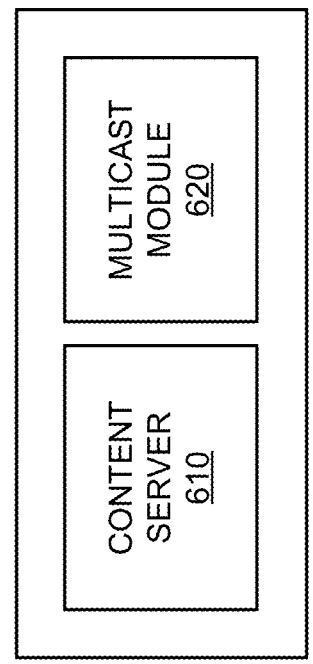
FIG. 6 is a block diagram of exemplary functional components of the content delivery system of FIG. 2.

FIG. 6 is a diagram of exemplary functional components of content delivery system 212. In one implementation, the functions described in connection with FIG. 6 may be performed by one or more components of device 300 (FIG. 3), such as processing unit 320 executing instructions store in memory 330. As shown in FIG. 6, content delivery system 212 may include a content server 610 and a multicast module 620.

Content server 610 may temporarily store and provide content requested by navigation device 110 and/or viewing device 120. In one implementation, access to content server 610 (e.g., by navigation device 110 and/or viewing device 120) may be restricted by a service provider that operates VCMS 210. For example, access to content server 610 may be restricted to users with particular subscription packages and enforced by, for example, password protection, device identifiers (for user devices 270), and/or application identifiers (e.g., personal channel manager application 400, etc.). Content server 610 may include other devices (not shown), such as a policy management server, a streaming device, a router, a content cache, etc. In some instances, content server 610 may provide a separate channel/link of the same content for different content formats. For example, content server 610 may generate a content stream that is compatible with a platform (e.g., a particular combination of hardware software) of some user devices 270, while another content stream (e.g., having a different data format and/or resolution) may be used for other types of user devices 270.

Multicast module 620 may identify if demand for content from a shared personal channel should be included in a multicast stream. For example, when a large number of user devices 270 are following a particular personalized channel plan 115 (such as a celebrity's personalized channel with a large number of social media followers), content distribution network 130 may benefit from multicast delivery for particular live or on-demand content scheduled in the personalized channel plan 115. Multicast module 620 may configure multicast sessions for distribution of the digital content. For example, multicast module 620 may communicate with a multicast streaming device to stream requested video content associated with a personal channel. Multicast module 620 may use internet protocol (IP) multicast addresses for IP flows that can be received simultaneously by viewing devices 120 (e.g., viewing devices that are subscribed to and have joined a particular multicast group associated with a content selection for the personalized channel).

In another implementation, multicast module 620 may utilize multicast streaming in a manner that optimizes use of network and/or media streaming resources for delivery of on-demand content. For example, multicast module 620 may provide different unicast segments (e.g., to start an on-demand program) and multicast segments (e.g., of an in-progress multicast delivery) to a viewing device 120. Multicast module 620 may work with viewing devices 120 to provide this hybrid of unicast and multicast content simultaneously so that viewing devices 120 may buffer multicast portions as needed to assemble and provide a linear presentation.

Although FIG. 6 shows exemplary functional components of content delivery system 212, in other implementations, content delivery system 212 may include fewer components, different components, or additional components than depicted in FIG. 6. Alternatively, or additionally, one or more functional components of content delivery system 212 may be performed by one or more other devices of network 200.

Figure 7:
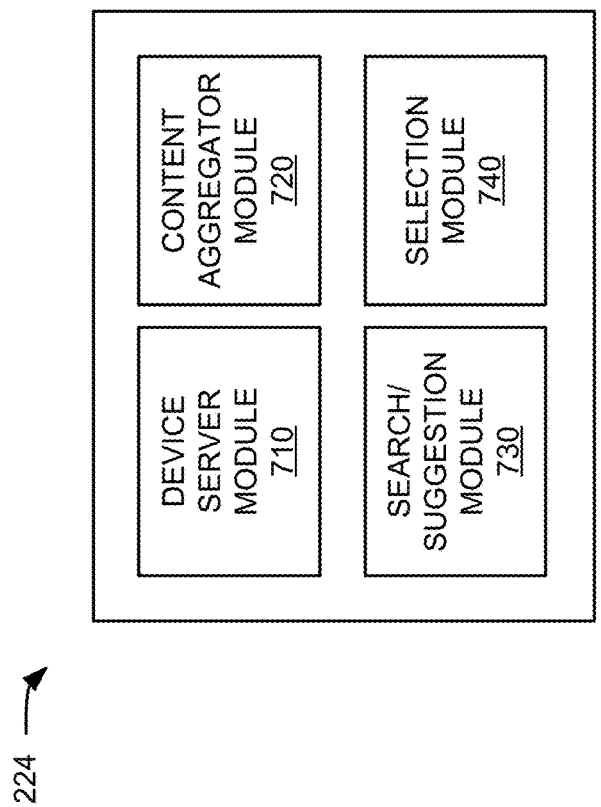
FIG. 7 is a block diagram of exemplary functional components of the application server of FIG. 2.

FIG. 7 is a diagram of exemplary functional components of application server 224. In one implementation, the functions described in connection with FIG. 7 may be performed by one or more components of device 300 (FIG. 3), such as processing unit 320 executing instructions store in memory 330. As shown in FIG. 7, application server 224 may include a device server module 710, a content aggregator module 720, a search/suggestion module 730, and a selection module 740.

Device server module 710 supports interactions between user devices 270 (e.g., navigation device 110 and/or viewing device 120) and backend servers, including (but not limited to) content delivery system 212, DRM server 214, and catalog server 222. Device server module 710 may determine which content format to use according a device type or platform of viewing device 120. For example, in one implementation, navigation device 110 may request, from application server 224, a streaming link or channel identifier for an item in a personalized content schedule just prior to a scheduled time slot. The request may include a content identifier and an identifier for viewing device 120. Device server module 710 may identify an appropriate format (e.g., bit rate, resolution, standard, file size, etc.) for the requested content on viewing device 120.

Based on the selected content and format, device server module 710 may provide/generate a streaming link. Navigation device 110 may receive the streaming link and provide the streaming link to viewing device 120 to present the scheduled content. In another implementation, viewing device 120 may request the streaming link for the item in the personalized content schedule based on instructions from navigation device 110, and device server module 710 may provide the content link directly to viewing device 120. In one implementation, device server module 710 may identify a location of viewing device 120 (e.g., based on account information and a device identifier) and provide/generate a streaming link based on the location (along with the content selection and device type). For example, a location may be used to select a link with particular advertising, regional content, and/or blackouts.

Content aggregator module 720 aggregates information from Internet searching and social networks related to particular content (e.g., a program or video) for a user to include in a personalized channel. In one implementation, content aggregator module 720 may provide links or other menu options to enable a user to schedule content provided by content aggregator module 720.

Search/suggestion module 730 enables users to search catalog server 222 and other devices/systems by keywords, titles, sources, etc. Search/suggestion module 730 may also provide ranked search results based on the user's search terms, profile, viewing history, or previously-purchased content. In one implementation, search/suggestion module 730 can also automatically recommend particular content to the user based on input from suggestion engine 250.

Selection module 740 enables users to review and select content from a variety of sources, including items from catalog server 222 and content aggregator module 720. Selection module 740 may support browsing and searching of a customized content list (e.g., a unified catalog from catalog server 222 and content aggregator module 720) from navigation device 110/personal channel manager application 400. In one implementation, selection module 740 may include a customized content listing based on a user's subscription package with a service provider (e.g., a basic, extended, or premium service option). In another implementation, selection module 740 may include, in a customized content listing, other personalized channels from a user's social media contacts. In some implementations, selection module 740 may also provide an electronic shopping cart, transaction management, and/or promotions and advertisements.

Although FIG. 7 shows exemplary functional components of application server 224, in other implementations, application server 224 may include fewer components, different components, or additional components than depicted in FIG. 7. Alternatively, or additionally, one or more functional components of application server 224 may be performed by one or more other devices of content distribution network 130.

Figure 8:
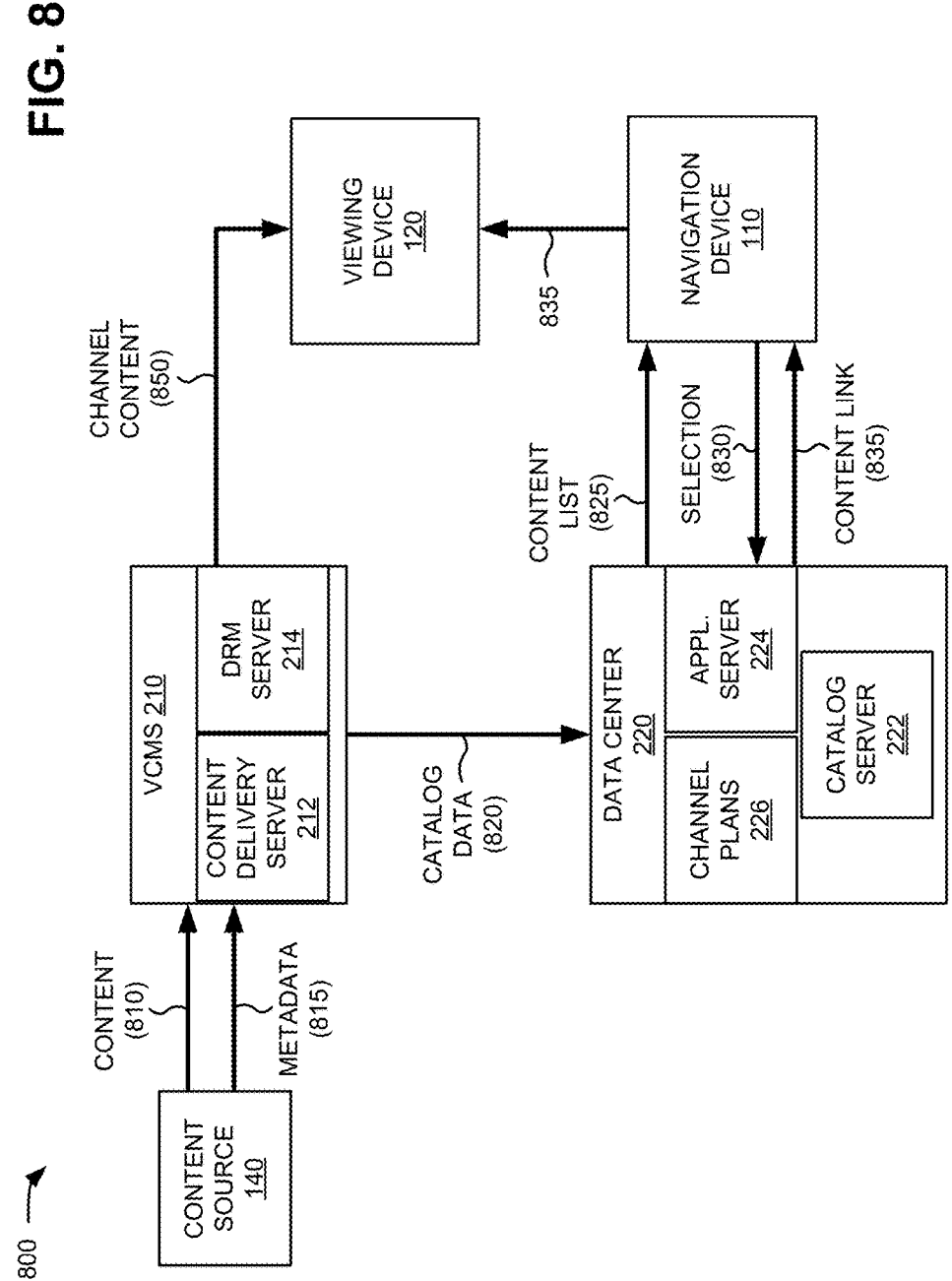
FIG. 8 is a block diagram of exemplary communications among devices in a portion of the network of FIG. 2.

FIG. 8 is a diagram of exemplary communications for a portion 800 of network 200. Communications in FIG. 8 may represent communications to configure, and view content from, a personalized channel according to implementations described herein. As shown in FIG. 8, network portion 800 may include navigation device 110, viewing device 120, content source 140, VCMS 210, and data center 220. Navigation device 110, viewing device 120, content source 140, VCMS 210, and data center 220 may include features described above in connection with, for example, FIGS. 1-7.

Figure 9:
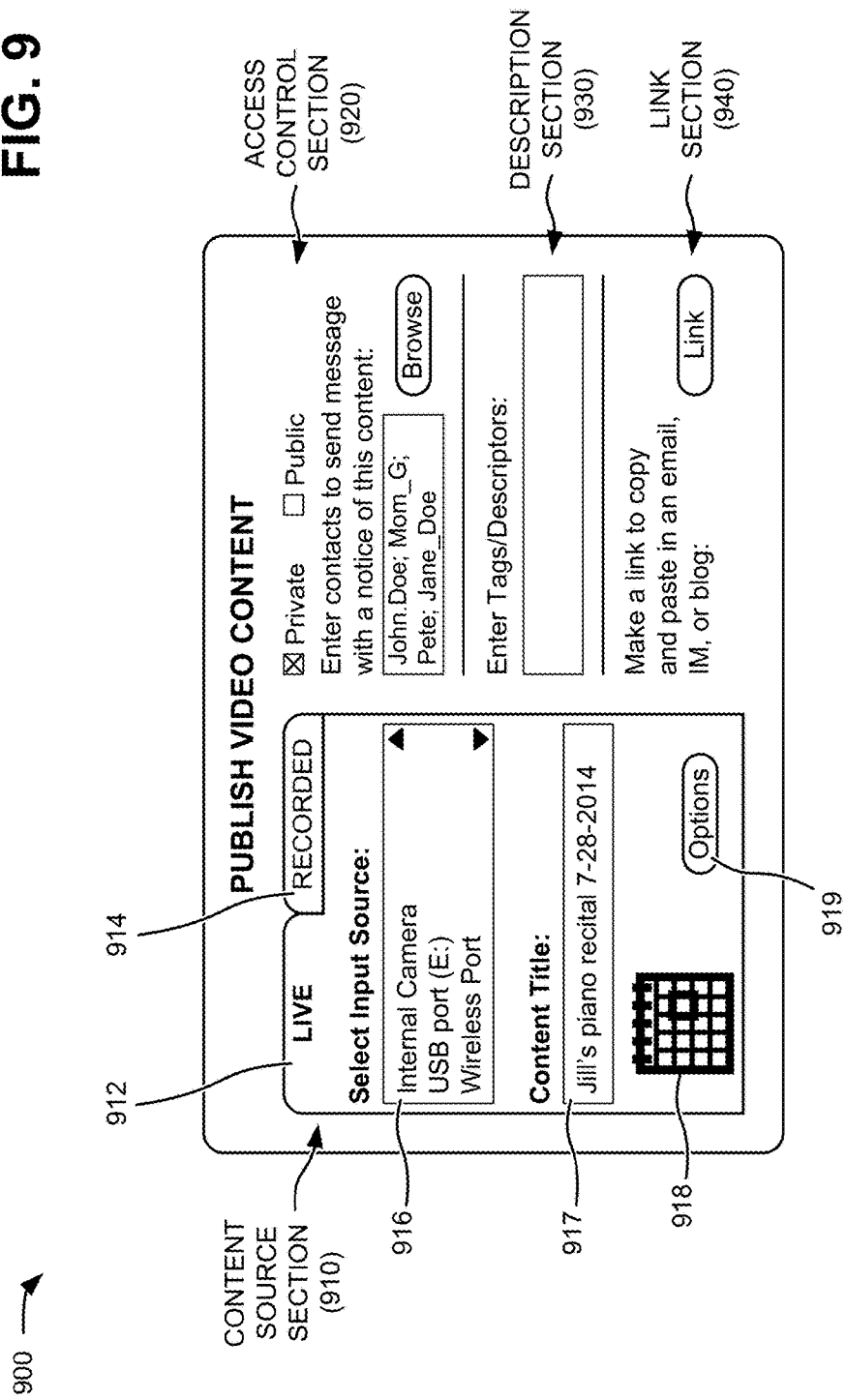
FIG. 9 is an exemplary user interface publishing video content according to an implementation described herein.

As shown in FIG. 8, content source 140 may upload content 810 and associated content metadata 815 to VCMS 210. In one implementation, VCMS 210 (e.g., uplink interface module 510) may provide a graphical user interface to solicit content 810 and content metadata 815. In one implementation, content 810 and metadata 815 may be provided concurrently. For example, if content 810 is previously recorded content, a user at content source may provide a complete content file and metadata. In another implementation, metadata 815 may be provided before content 810, such as when content 810 is live linear content scheduled for a future time. FIG. 9 provides a schematic of an exemplary user interface 900 that may be used to guide the uploading of content 810 and metadata 815.

Referring to FIG. 9, user interface 900 may be presented, for example, on a computing device, such as a user device 270 or another computing device. In one implementation, user interface 900 may be included as part of content upload client application. In another implementation, user interface 900 may be included in a web page accessible through a browser application.

As shown in FIG. 9, user interface 900 may include a content source section 910, an access control section 920, a description section 930, and a link section 940. Content source section 910 may include separate tabs 912 and 914 (or subsections) for live content and recorded content, respectively. Live content tab 912 may solicit information relevant to uploading of linear content for real-time (or near-real-time) presentation. Thus, live content tab 912 may include an input source section 916 to identify a source (such as an internal camera of a computing device or an external device connected via a wired or wireless port) for a live media stream. Live content tab 912 may also include a title section 917, a schedule section 918, and an options section 919. Title section 917 may include an input section to receive a name for the content/program to be uploaded. Schedule section 918 may solicit a date, start time, and end time for the live content. In one implementation, schedule section 918 may require only a start time and identify an end time when signaled by, for example, the content upload client application at content source 140. Options section 919 may allow the user to identify parameters for the live content feed, such a connection speed, video format, additional source information, etc.

Recorded content tab 914 may be selected by the user to upload, for example, a content file. Recorded content tab 914 may solicit, for example, a file name and local storage location for the content file.

Content attributes from access control section 920, description section 930, and link section 940 may be applied to content uploads from either of live content tab 912 or recorded content tab 914 in content source section 910. Access control section 920 may allow a user to identify content as either private or public. Private content may be limited to particular viewer or groups of viewers. For example, private content may be restricted by the user that uploads/produces the content to permit access by only particular users (e.g., user accounts) or to any contact in the user's contact list. In one implementation, access control section 920 may automatically notify a list of contacts when content from the user is published. Public content may be viewed by, for example, any user of content distribution network 130.

Description section 930 may include an entry form to allow a user to input keywords and/or tags to be associated as metadata (e.g., metadata 815) with the particular uploaded content. In one implementation, description section 930 may provide keyword suggestions (e.g., based on previous entries, current trends, etc.). In another implementation, textual descriptions may be used (e.g., up to a limited amount of characters).

Link section 940 may include a prompt to cause VCMS 210 to generate a link (e.g., a dedicated identifier or URL) for the particular content. The link may be associated with the content and identify a network location (e.g., in content distribution network 130) through which the uploaded content can be accessed. The link may be provided to contacts, for example, to access the content without relying on catalog server 222 and may be shared over social media.

Although FIG. 9 depicts certain user interfaces for configuring a personalized channel, in other implementations, different user interfaces may be used that depict more, less, and/or different information than depicted in FIG. 9.

Returning to FIG. 8, VCMS 210 may receive uploaded (e.g., live or recorded) content 810 and metadata 815 from content source 140. VCMS 210 may compile data from content 810 and metadata 815 into catalog data 820. VCMS 210 may forward catalog data 820 to data center 220 (e.g., for distribution by catalog server 222). Navigation device 110 may retrieve content list 825 from data center 220. The content list 825 may include, for example, content items from catalog server 222 that are responsive to a particular search query from navigation device 110. For example, the one of the responsive content items may include content 810. Navigation device 110 (e.g., using personal channel manager application 400) may solicit user input to incorporate desired content items (such as content item 810) from content list 825 into a selection 830. Selection 830 may include, for example, a single content item selection and a viewing device identifier. Alternatively, selection 830 may be included within a personalized channel plan. In another implementation, navigation device 110 may receive a notification of particular content (e.g., private content) via a notification message (not shown) and incorporate, into selection 830, a link for the content listing in catalog server 222.

In response to selection 830, data center 220 may provide a content link 835, such as a URL or channel identifier, to navigation device 110 to enable viewing device 120 to tune to or view the content selected by the user. In one implementation, content links 835 may include a URL for a private managed network (e.g., a private portion of access network 290). Thus, if accessible to viewing device 120, a service provider may provide requested content with guaranteed QoS levels and/or other benefits that may not be available through a public network or with non-Guaranteed Bit Rate (GBR) traffic. For example, one or more of content links 835 may direct a device (e.g., viewing device 120) to a network location that is only accessible to particular devices (e.g., a proprietary STB) or particular accounts (e.g., subscribers with verified account credentials). In other implementations, one or more of content links 835 may provide unrestricted access to content.

Navigation device 110 may receive content link 835 and may provide content link 835 to viewing device 120 for presentation of the content. Content link 835 may include, for example, the network location for viewing device 120 to obtain the required content feed from VCMS 210.

Viewing device 120 may use content link 835 to retrieve content from VCMS 210. In some implementations, content may require DRM authentication via DRM server 214.

For example, content associated with selection 830 may be subject to copyright and/or license restrictions. Viewing device 120 may access a streaming URL (e.g., via content link 835) to request the particular content from VCMS 210. In response, VCMS 210 (e.g., content delivery system 212) may begin streaming the requested channel content 850, including a content header. A content header can include information about where to fetch a DRM license to permit viewing device 120 to display the channel content 850. Based on the content header, viewing device 120 may submit a separate license request to VCMS 210 (e.g., DRM server 214) to retrieve a DRM license before presenting the content.

In another implementation, VCMS 210 may also apply information from profile server 230 and/or advertising server 240 to provide targeted advertising to the user providing selection 830.

Although FIG. 8 shows exemplary communications within network portion 800, in other implementations, different communications may be used than depicted in FIG. 8. For example, in another implementation, content link 835 may include a channel identifier that can be tuned to by viewing device 120 (e.g., when viewing device 120 includes a STB/TV combination).

FIG. 10 is a flow diagram of an exemplary process 1000 for publishing content for access via a personalized channel. In one implementation, process 1000 may be performed by one or more devices in content distribution network 130. In other implementations, process 1000 may be performed by navigation device 110 and/or viewing device 120 in conjunction with one or more devices from content distribution network 130.

Process 1000 may include receiving and authenticating login credentials for a content source (block 1010) and providing an uplink user interface to describe and upload video content (block 1020). For example, VCMS 210 may receive an account user name and password for a subscriber of content sharing services. VCMS 210 may verify the user name and password to provide access, for example, to a web page with an uplink user interface (e.g., user interface 900) that allows the user to describe and upload content.

Process 1000 may also include receiving descriptive information for the video content via the uplink user interface (block 1030) and generating a unique content identifier for the video content (block 1040). For example, using the uplink user interface (e.g., user interface 900), a user at content source 140 may identify content as live or recorded video content, provide a title, identify a source, provide access restrictions (e.g., public/private access), and provide content descriptors. VCMS 210 may receive the user input and may assign a content identifier. If the content is live content, VCMS 210 may provide the content identifier in advance of receiving uploaded content. If the content is recorded content, VCMS 210 may provide the content identifier in advance, concurrently, or after receiving the uploaded content. The unique content identifier may be used, for example, in a link and/or notification message to potential viewers (e.g., for private content) and/or in a catalog of content.

Process 1000 may further include incorporating the listing of the video content into a catalog of content available to users (block 1050). For example, VCMS 210 may communicate with data center 220 (e.g., catalog server 222) to provide catalog updates that include content uploads (or scheduled uploads for live linear content) from content source 140. Users of navigation device 110 may identity content from content source 140 via title searches, keyword searches, source searches, or category searches of a catalog listing (from catalog server 222) based on, for example, various metadata previously provided via user interface 900.

Process 1000 may additionally include receiving the video content from the content source (block 1060), receiving a request, from a user device, to view the video content (block 1070), and providing a link to view the video content via the content distribution network (block 1080). For example, as described in connection with FIG. 8, content source 140 may provide video content (e.g., content 810) to VCMS 210. Based on a selection (e.g., using a unique content identifier from a catalog listing or a notification message for private access), a navigation device 110 may request a content link for the selected content. Data center 220 may provide a content link (content link 835) to navigation device 110 to enable navigation device 110 to instruct a viewing device (e.g., viewing device 120) to retrieve and present the selected content.

Systems and/or methods described herein provide techniques for micro-publishers and other content providers to upload live and previously-recorded content for distribution as part of a content aggregation platform. Network devices may provide, to a content source device, an uplink user interface to facilitate describing and uploading of video content. The network devices may receive, via the uplink user interface, descriptive information for the video content and generate, based on the descriptive information received via the uplink user interface, a unique content identifier for the video content. The network devices may incorporate, based on the uploading, a listing of the video content into a catalog of content available to users of a content distribution network. The network devices may receive, from the content source device, the video content and may receive, from a user device, a request to view the video content that includes the unique content identifier. The network devices may provide, to the user device, a link to enable the user device to access the video content via the content distribution network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   providing, by a network device and to a content source device, an uplink user interface to describe and upload video content;
   receiving, by the network device and via the uplink user interface, descriptive information for the video content;
   generating, by the network device and based on the descriptive information received via the uplink user interface, a unique content identifier for the video content;
   incorporating, by the network device and based on the descriptive information, a listing of the video content into a catalog of content available to users of a controlled access network that provides guaranteed quality of service (QoS) levels to subscribing viewers;
   receiving, by the network device and from the content source device, the video content;
   receiving, by the network device and from a user device, a selection of the video content from the catalog of content, wherein the selection includes the unique content identifier and a viewing device identifier, and wherein a viewing device associated with the viewing device identifier is a closed device for the controlled access network, and wherein the viewing device is different than the user device; and
   sending, by the network device and to the user device, a link that is responsive to the selection of the video content, wherein the link is included within a channel plan stored on the user device, and the link, when sent from the user device to the viewing device, enables the viewing device to access the video content via the controlled access network with one of the guaranteed QOS levels, and wherein the link is sent to the user device via a public access network that is different than the controlled access network, and
   wherein the link includes a uniform resource locator (URL), based on the viewing device identifier, identifying a network location to retrieve a content stream formatted with a data format and resolution compatible with a particular type of the viewing device.

2. The method of claim 1, wherein the viewing device includes a set-top box (STB), and wherein the link includes a channel identifier through which the viewing device can retrieve the video content directly from the controlled access network.

3. The method of claim 1, wherein the controlled access network includes at least one of a closed cable or a closed fiber-optic distribution network, and wherein the link includes a channel identifier for the video content.

4. The method of claim 1, further comprising:
receiving, by the network device, login credentials for the content source device, wherein the login credentials identify an authorized subscriber for content publishing services.

5. The method of claim 1, wherein the uplink user interface solicits, from a user, a title for the video content, a source for the video content, and descriptors for the video content.

6. The method of claim 5, wherein the uplink user interface further solicits the user to provide a private access designation or a public access designation for the video content.

7. The method of claim 6, further comprising:
limiting access to the listing to subscribers identified by the user when the user provides a private access designation.

8. The method of claim 1, wherein receiving the video content occurs after the generating the unique content identifier for the video content, and wherein the video content includes live linear content.

9. The method of claim 1, wherein the uplink user interface includes one of a web page or an application for a mobile device.

10. The method of claim 1, wherein the link is provided to the user device via a mobile access network.

11. One or more network devices, comprising:
a first network interface to communicate with a content source device;
a second network interface to communicate with a user device that is different than the content source device;
a memory for storing instructions; and
one or more processors to execute the instructions to:
provide, to a content source device via the first network interface, an uplink user interface to describe and upload video content;
receive, via the uplink user interface, descriptive information for the video content;
generate, based on the descriptive information received via the uplink user interface, a unique content identifier for the video content;
incorporate, based on the descriptive information, a listing of the video content into a catalog of content available to users of a controlled access network that provides guaranteed quality of service (QoS) levels to subscribing viewers;
receive, from the content source device and via the first network interface, the video content;
receive, from a user device, a selection of the video content from the catalog of content, wherein the selection includes the unique content identifier and a viewing device identifier, and wherein a viewing device associated with the viewing device identifier is a closed device for the controlled access network, and wherein the viewing device is different than the user device; and
send, to the user device via the second network interface, a link that is responsive to the selection of the video content wherein the link is included within a channel plan stored on the user device, and the link, when sent from the user device to the viewing device, enables the viewing device to access the video content via the controlled access network with one of the guaranteed QOS levels, and wherein the link is sent to the user device via a public access network that is different than the controlled access network, and
wherein the link includes a uniform resource locator (URL), based on the viewing device identifier, identifying a network location to retrieve a content stream formatted with a data format and resolution compatible with a particular type of the viewing device.

12. The one or more network devices of claim 11, wherein the viewing device includes a set-top box (STB), and wherein the link includes a channel identifier through which the viewing device can retrieve the video content directly from the controlled access network.

13. The one or more network devices of claim 11, wherein the one or more processors are further to:
deliver the video content using unicast and multicast delivery of different portions of the video content.

14. The one or more network devices of claim 11, wherein the uplink user interface solicits, from a user, descriptors for the video content, and wherein the one or more processors are further to:
associate the descriptors as metadata for the video content to facilitate searches for the video content.

15. The one or more network devices of claim 11, wherein the uplink user interface solicits, from a user, access designations for the video content, and wherein the one or more processors are further to:
limit access to the listing to subscribers identified by the user when the user provides a private access designation.

16. The one or more network devices of claim 11, wherein the video content includes live linear video content.

17. A non-transitory computer-readable medium, storing instructions executable by one or more processors, the non-transitory computer-readable medium comprising one or more instructions to:
provide, to a content source device via a first network interface, an uplink user interface to describe and upload video content;
receive, via the uplink user interface, descriptive information for the video content;
generate, based on information received via the uplink user interface, a unique content identifier for the video content;
incorporate, based on the descriptive information, a listing of the video content into a catalog of content available to users of a controlled access network that provides guaranteed quality of service (QoS) levels to subscribing viewers;
receive, from the content source device, the video content;
receive, from a user device, a selection of the video content from the catalog of content, wherein the selection includes the unique content identifier and a viewing device identifier, and wherein a viewing device associated with the viewing device identifier is a closed device for the controlled access network, and wherein the viewing device is different than the user device; and
send, to the user device via the second network interface, a link that is responsive to the selection of the video content, wherein the link is included within a channel plan stored on the user device, and the link, when sent from the user device to the viewing device, enables the viewing device to access the video content via the controlled access network with one of the guaranteed QOS levels, and wherein the link is sent to the user device via a public access network that is different than the controlled access network, and
wherein the link includes a uniform resource locator (URL), based on the viewing device identifier, identifying a network location to retrieve a content stream formatted with a data format and resolution compatible with a particular type of the viewing device.

18. The non-transitory computer-readable medium of claim 17, wherein the link is further provided to the user device via a mobile access network.

19. The non-transitory computer-readable medium of claim 17, further comprising one or more instructions to:
provide the video content to one or more viewing devices using multicast delivery.

* * * * *